US006563620B1

(12) United States Patent
Hakimi et al.

(10) Patent No.: US 6,563,620 B1
(45) Date of Patent: May 13, 2003

(54) QUASI-DISPERSIONLESS OPTICAL FIBER TRANSMISSION, DISPERSION COMPENSATION AND OPTICAL CLOCK

(75) Inventors: Farhad Hakimi, Watertown, MA (US); Hosain Hakimi, Watertown, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/282,880

(22) Filed: Mar. 31, 1999

Related U.S. Application Data

(60) Provisional application No. 60/117,146, filed on Jan. 25, 1999.

(51) Int. Cl.[7] .................. H04B 10/12; H04B 10/00; H04K 3/00
(52) U.S. Cl. .............. 359/173; 359/154; 359/161; 359/169; 359/111
(58) Field of Search .................. 359/173, 161, 359/154, 169, 126

(56) References Cited

U.S. PATENT DOCUMENTS

| | | | | |
|---|---|---|---|---|
| 4,976,518 A | * | 12/1990 | Burns ................... | 350/96.16 |
| 5,613,028 A | * | 3/1997 | Antos et al. ............ | 385/123 |
| 5,633,885 A | * | 5/1997 | Galvanauskas et al. .... | 372/25 |
| 5,822,100 A | * | 10/1998 | Robinson et al. ......... | 359/161 |
| 5,857,040 A | * | 1/1999 | Bigo et al. ............. | 385/15 |
| 5,923,683 A | * | 7/1999 | Morioka et al. .......... | 372/6 |
| 5,978,532 A | * | 11/1999 | Rigny et al. ............ | 385/46 |
| 5,982,963 A | | 11/1999 | Feng et al. ............. | 385/37 |
| 6,014,237 A | * | 1/2000 | Abeles et al. ........... | 359/124 |
| 6,081,640 A | * | 6/2000 | Ouellette et al. ........ | 385/37 |
| 6,122,419 A | * | 9/2000 | Kurokawa et al. ......... | 385/31 |
| 6,122,421 A | * | 9/2000 | Adams et al. ............ | 385/37 |
| 6,292,282 B1 | * | 9/2001 | Mossberg et al. ......... | 359/123 |
| 6,313,932 B1 | * | 11/2001 | Roberts et al. .......... | 359/124 |

OTHER PUBLICATIONS

"Fibre Dispersion or Pulse Spectrum Measurement Using a Sampling Oscilloscope," Y.C. Tong et al., *Electronic Letters*, May 22, 1997, vol. 33, No. 11, 983–985.

"Real–Time Fourier Transformation in Dispersive Optical Fibers," Tomasz Jannson, *Optical Letters*, vol. 8, No. 4, Apr. 1983, 232–234.

"Space–Switching 2.5 Gbit/s Signals Using Wavelength Conversion and Phased Array Routing," A.A.M. Staring et al., Electronics Letters, vol. 32, No. 4, Feb. 15, 1996, pp 377–379.

"Applications of the Integrated Waveguide Grating Router," B. Glance et al., Journal of Lightwave Technology, vol. 12, No. 6, Jun. 1994, pp 957–962.

"Waveguide Array Wavelength Router Design to Improve Insertion Loss Uniformity," Hideaki Okayama et al., Optical Review, vol. 4, Nov. 5, 1997, pp 543–545.

"Recent Progress in Silica–Based Planar Lightwave Circuits on Silicon," M. Kawachi, IEE Proc. Optoelectron, vol. 143, No. 5, Oct. 1996, pp 257–261.

(List continued on next page.)

*Primary Examiner*—Leslie Pascal
*Assistant Examiner*—David C. Payne
(74) *Attorney, Agent, or Firm*—Fish & Richardson P.C.

(57) ABSTRACT

A method of transmitting optical pulses in a transmission media includes separating a coherent source optical pulse into a plurality of mutually coherent pulses, and producing a series of mutually coherent optical pulses from the plurality of pulses. The series is transmitted through the media, and the pulses of the series are received at a distant region of the media. The series of pulses is adapted to interfere and form a packet whose width is narrower than the width of any pulse of the series at the distant region.

28 Claims, 15 Drawing Sheets

OTHER PUBLICATIONS

"Devices for Wavelength–Division Multiplexing (WDM)," Pierangelo Morra et al., Fibert Optics Handbook for Engineers and Scientists, Frederick C. Allard, Ed., 1990, Ch 3, pp 3.63–3.78.

"Interferometric All–Optical Switches for Ultrafast Signal Processing," Naimish S. Patel et al., Applied Optics, vol. 37, No. 14, May 10, 1998, pp 2831–2842.

"Nonlinear Loop Mirror Devices and Applications," K.J. Blow et al., BT Technol J, vol. 11, No. 2, Apr. 1993, pp 99–107.

"New 3–Port/4–Port Optical Circulator," Jay Van Delden, Photonics Spectra, Jan. 1992, 2 pages.

"Dense Wavelength Division Multiplexer," 1X16 and 1Z32 DWDM's with Integral Thermal Management System, Lucent Technologies Advertisement (1997), 2 pages.

"Dense Wavelength Division Multiplexing Networks: Principles and Applications," C.A. Bracket, IEEE Journal on Selected Areas in Communications, vol. 8, No. 6, Aug. 1990, pp 948–964.

* cited by examiner

QUASI-DISPERSIONLESS OPTICAL FIBER TRANSMISSION, DISPERSION COMPENSATION AND OPTICAL CLOCK

This application claims the benefit of U.S. Provisional Application No. 60/117,146, filed Jan. 25, 1999.

This invention was made with government support under Contract Number F19628-95-C-0002 awarded by the Air Force. The government has certain rights in the invention.

BACKGROUND OF THE INVENTION

This invention relates generally to transmitting optical signals, and more particularly, to reducing pulse broadening in optical fibers and to optical clocks.

FIG. 1 shows that an initial optical pulse 2 becomes a broader pulse 3 after traveling through an optical fiber 4. The broadening of the pulse 2 results from dispersion. One reason for dispersion is the variation of a fiber's index of refraction with wavelength. The index of refraction variations make longer and shorter wavelength components of the pulse 2 travel at different speeds in the optical fiber 4. After traveling through a certain length of the optical fiber 4, the speed variations produce the broader pulse 3. Another reason for dispersion is waveguide dispersion, which is induced by the geometric configuration of the fiber 4.

Pulse broadening can affect the quality of digital data transmission in the optical fiber 4. Digital data is transmitted as a series of optical pulses. Each temporal interval for a source pulse represents one binary bit. The binary states "1" and "0" correspond to the presence and absence of a pulse, respectively. As pulses broaden and overlap, a receiver may not be able to determine whether a pulse is present in a particular time interval or whether a detected optical signal is the tail of a previous or subsequent pulse. Inserting an amplifier 5 into the optical fiber 4 can aid to reduce receiver errors due to propagation weakening of pulse intensities. But, the amplifier 5 does not aid to reduce receiver errors caused by the dispersion generated pulse broadening and overlap.

Present optical fiber communications use optical pulses having wavelengths of about 1.5 microns, because erbium-doped fibers can provide quality optical amplification at 1.5 microns. Unfortunately, many older optical fibers produce significant chromatic dispersion in optical signals at 1.5 microns. This chromatic dispersion produces significant pulse broadening, which limits transmission wavelengths and distances in contemporary optical networks.

SUMMARY OF THE INVENTION

In one aspect, the invention provides a method for transmitting optical pulses in a transmission medium. The method includes separating a coherent source optical pulse into a plurality of mutually coherent pulses, and producing a series from the plurality of pulses. The series is transmitted through the medium, and the pulses of the series are received at a distant region of the medium. The series of pulses is adapted to interfere and form a packet whose width is narrower than the width of any pulse of the series at the distant region of the medium.

In preferred embodiments, the method further includes dividing the source pulse into a plurality of pulses directed into different directions, sending the pulse directed in each direction through a separate optical waveguide to produce a delayed output pulse, and recombining the output pulses to produce the series. Each output pulse has a different delay.

In a second aspect, the invention provides an apparatus for transmitting an optical signal in an optical fiber. The apparatus includes an optical beam splitter to split a source light signal into a plurality of separated, mutually coherent light signals, an optical train to produce a series of mutually coherent, outgoing light signals from the separated signals, and a combiner. Each outgoing light signal has a different time delay. The combiner receives the outgoing light signals from each of said conduits and is adapted to redirect the received light signals into an optical fiber.

Embodiments of the invention provide methods and apparatus for quasi-dispersionless optical communications links. Some embodiments compensate dispersion induced pulse broadening in optical fibers. The reduced pulse broadening enables higher data rate transmission in long optical fibers. Other embodiments compensate dispersion induced pulse broadening occuring in free space propagation of optical signals.

BRIEF DESCRIPTION OF THE DRAWINGS

Other objects, features, and advantages of the invention will be apparent from the following description taken together with the drawings in which.

DESCRIPTION OF THE PREFERRED EMBODIMENTS

Figure 1:
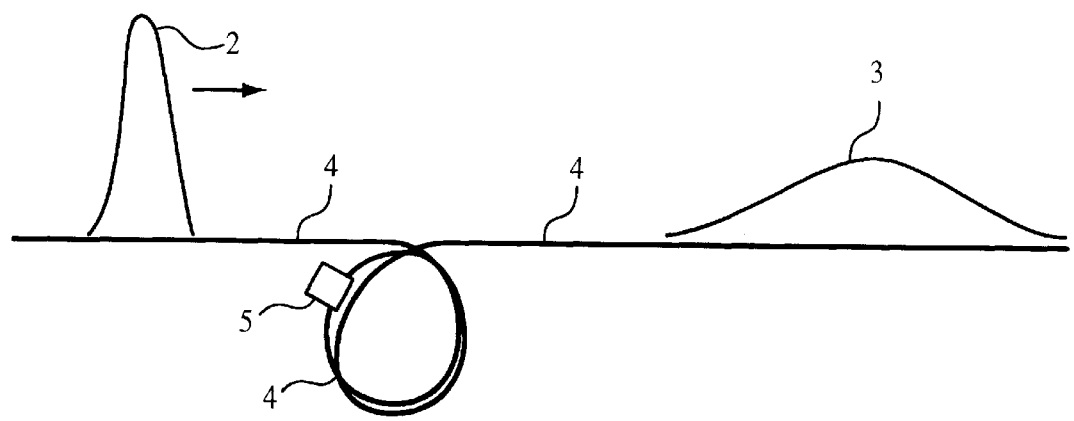
FIG. 1 illustrates pulse broadening in a prior art optical fiber.
Figure 2:
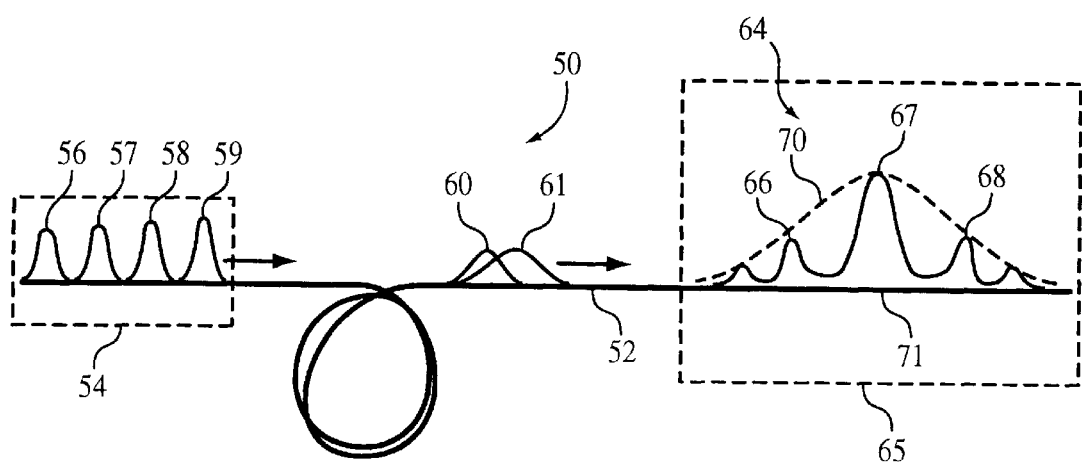
FIG. 2 shows a system, which uses interference to reduce pulse broadening in an optical fiber.

FIG. 2 schematically illustrates a system 50, which uses interference to reduce pulse broadening in an optical fiber 52. From each source pulse to be transmitted, transmitter 54 produces a series of mutually coherent pulses 56–59 and sends the mutually coherent pulses 56–59 into the optical fiber 52. Each pulse 57–59 has a nonzero time delay with respect to the preceding pulse 56–58. The pulses 56–59 broaden and overlap due to dispersion as they move down the fiber 52. For example, pulses 57, 58 broaden to become overlapping pulses 60, 61 after a certain propagation time. A receiver 65 receives the coherent broadened pulses.

At the distant receiver 65, pulse-overlap and interference produces an interference pattern 64. The interference pattern 64 has narrow maxima 66–68. The pattern 64 is similar to an interference pattern produced by a coherent light beam after passing through a multiple slit aperture.

To better appreciate the pattern 64 at the receiver 65 of FIG. 2, it is useful to recall how single and multiple slit apertures produce optical interference.

Figure 3:
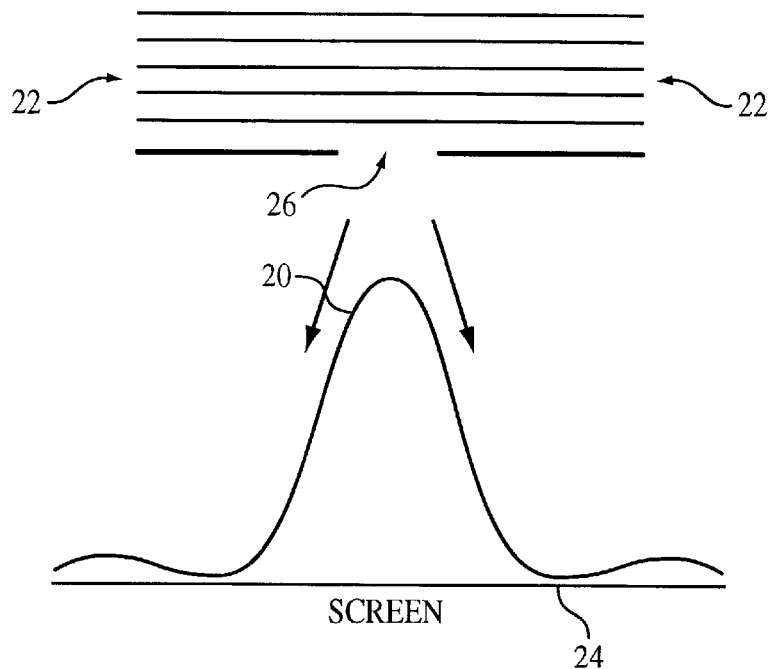
FIG. 3 illustrates diffraction broadening caused by a wide slit.

FIG. 3 shows an intensity pattern 20, which a coherent light beam 22 makes on a screen 24 located behind a wide slit 26. If the slit 26 is not too wide, diffraction broadens the intensity pattern 20 to beyond the width of the slit 26.

Figure 4A:
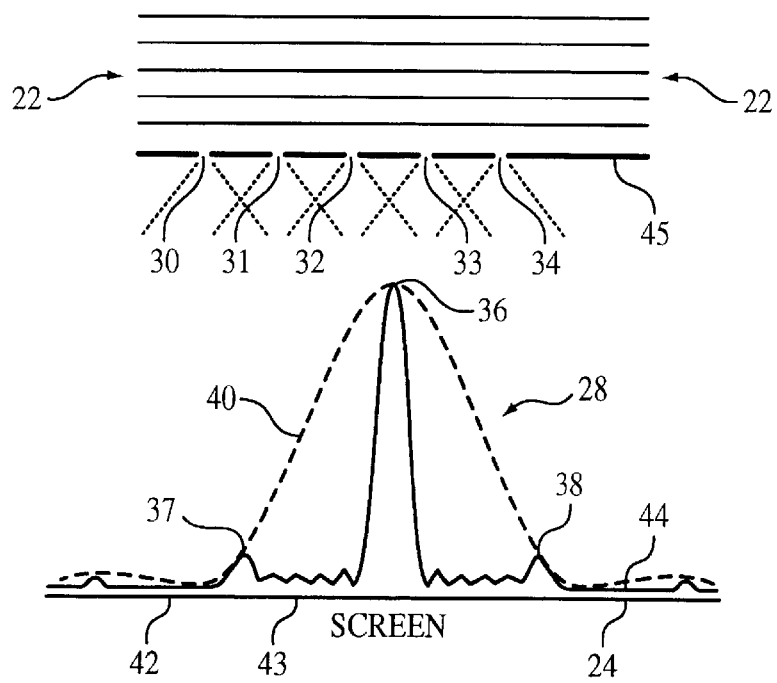
FIG. 4A illustrates multi-slit interference.

FIG. 4A shows an intensity pattern 28, which the coherent light beam 22 produces on the screen 24 when located behind multiple narrow slits 30–34. The intensity pattern 28 has maxima 36–38 and minima 42–44 due to interference between light from the different slits 30–34. The light from each slit 30–34 follows a different optical path to reach the screen 24 and thus, has a different phase at the screen 24 than light from the other slits 30–34. The phase differences cause the light to interfere producing the central maximum 36, which is much narrower than the diffraction-widened pattern 20 from the wide slit 26 of FIG. 3. The envelope 40 of the intensity pattern 28 matches the pattern 20 from the wide slit 26 of FIG. 3.

The multiple slits 30–34 produce maxima 36–38 that become narrower as the density of the slits 30–34 increases. Uniform spacings of the slits 30–34 produce both the central maximum 36 and the secondary maxima 37, 38 on each side.

Figure 4B:
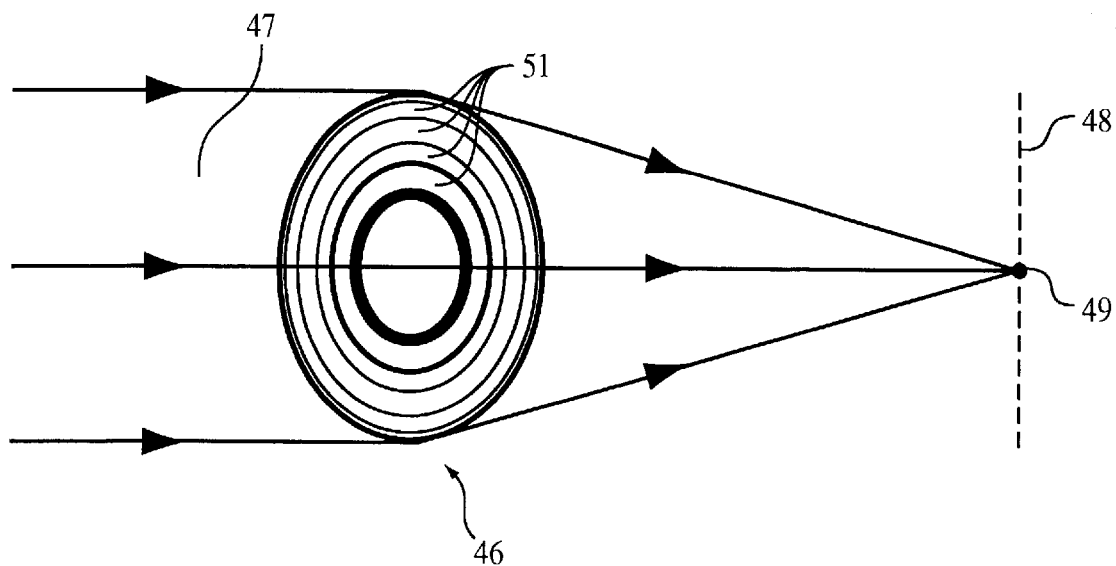
FIG. 4B illustrates interference from a Fresnel zone plate.

FIG. 4B shows a interference pattern produced by a Fresnel zone plate 46. The zone plate 46 interferes light from a coherent incoming beam 47 to produce the interference pattern at the focal plane 48. The interference pattern consists of a well focused spot 49 without substantial secondary maxima, e.g., the maxima 37, 38 of FIG. 4A. The absence of secondary maxima is due to the non-uniform spacings of the transmission rings 51 of the zone plate 46. The successive transmission rings 51 have radii related by irrational ratios, i.e., the radii are $R$, $\sqrt{2}R$, $\sqrt{3}R$, $\sqrt{4}R$, etc. These non-uniform spaced rings 51 produce interference, which results in a single spot 49 on the focal plane 48.

Referring again to FIG. 4A, an interference pattern with single maxima can also occur if the ratios of the distances between each slit 31–34 and the first slit 30 are irrational numbers. For example, if the distance $L_N$ of the Nth slit 31–34 from the first slit 30 satisfies $L_N = A(N)^{1/2}$, the secondary maxima 37, 38 become very small or disappear. The irrationality of the slit spacings correspond to irrational phase differences from light received from the different slits at the secondary maxima 37–38. Such phase differences cause destructive interference.

Referring again to FIG. 2, the interference pattern 64 in the receiver 65 comes from the time delays in the series of original coherent pulses 56–59. The interference pattern 64 has a narrower central maxima 67 than the envelope 70 that would result from sending a single pulse down the fiber 52.

Figure 5:
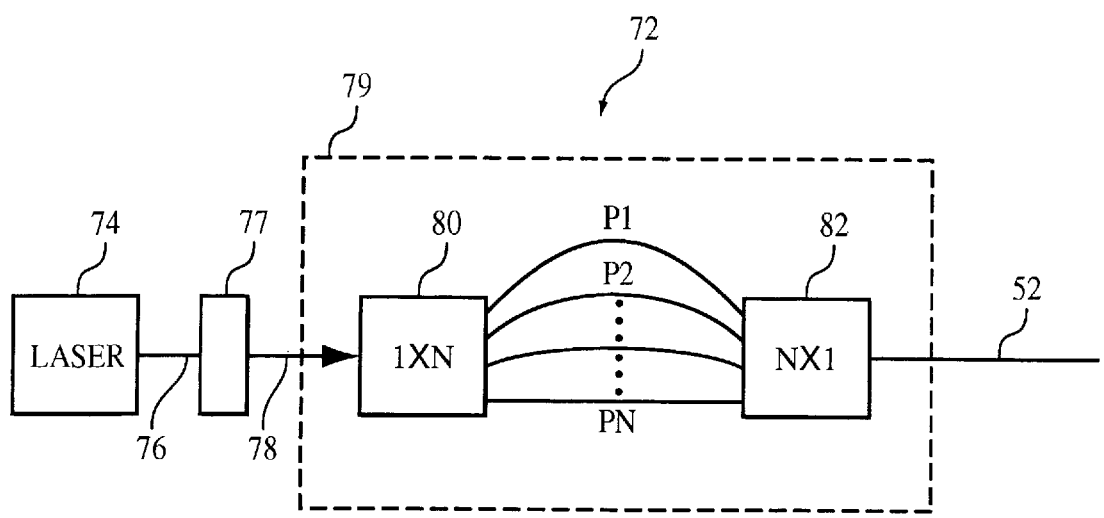
FIG. 5 shows an optical transmitter for use in the system of FIG. 2.

FIG. 5 illustrates one embodiment 72 of the optical transmitter 54 shown in FIG. 2. A laser 74 produces a monochromatic light beam 76, which is chopped to a sequence of source pulses by a programmable high-speed shutter 77. The source pulses carry the binary data sequence to be transmitted to the receiver 65. Each source pulse enters a pulse splitter 79, which produces a series of N delayed and coherent pulses from the source pulse and sends the series of pulses to the optical fiber 52.

The illustrated pulse splitter 79 uses a 1×N beam splitter 80, e.g., a 1×N fiber coupler, to produce N mutually coherent pulses from each source pulse. The 1×N beam splitter 80 has an optical output along each of N directions, and each output couples to an optical waveguide $P_1$–$P_N$, e.g., optical fibers. Each optical waveguide $P_1$–$P_N$ has an optical length measured to produce one of the temporal delays of the series of pulses 56–59 of FIG. 2. The optical waveguides $P_1$–$P_N$ couple to an inverted 1×N beam splitter 82 that recombines the delayed pulses to produce the series of pulses 56–59 shown in FIG. 2. The pulse splitter 79 may also include optical amplifiers (not shown) either in the separate waveguides $P_1$–$P_N$ or at its output.

Figure 6:
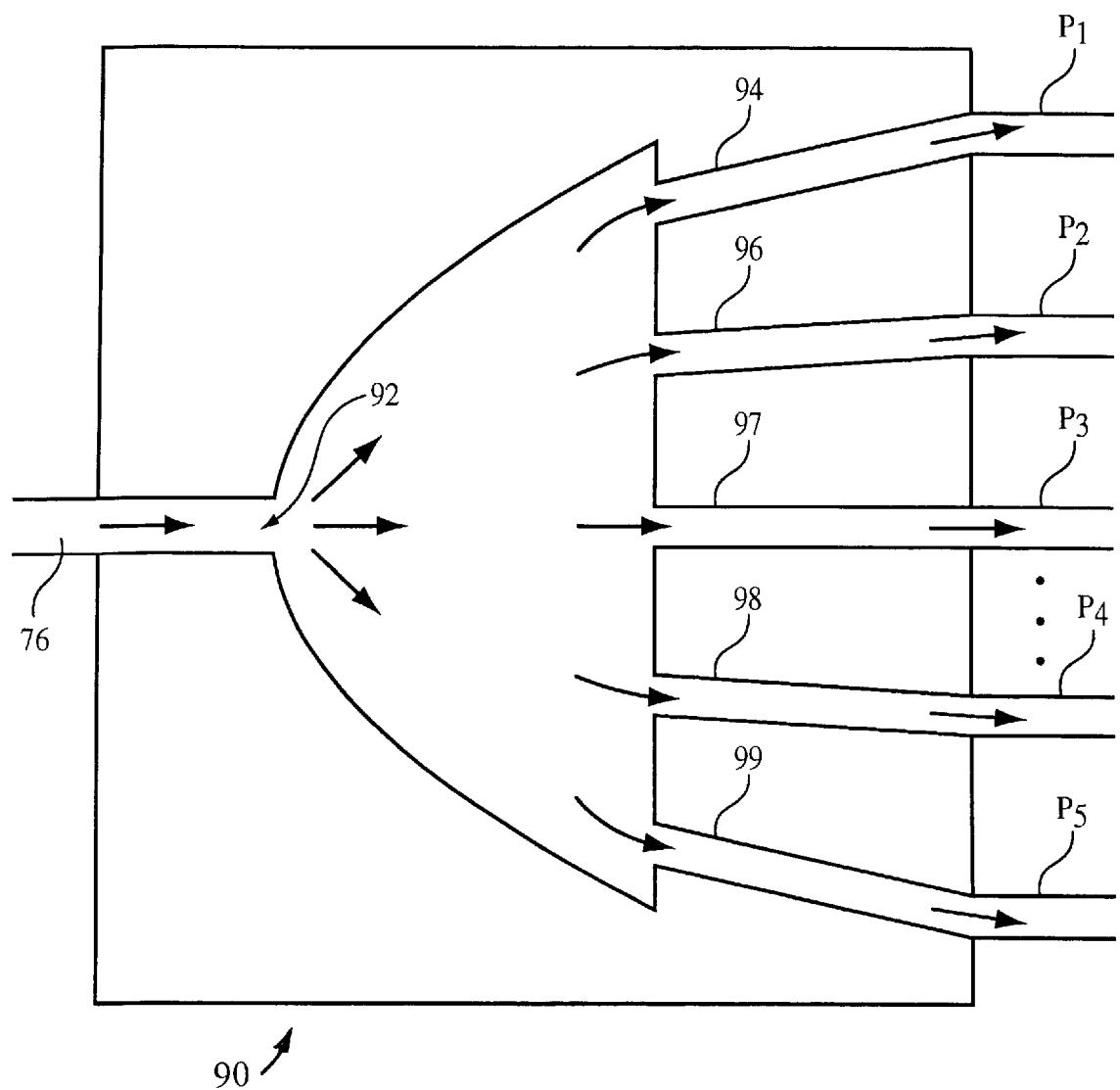
FIG. 6 shows an optical pulse splitter for use in the transmitter of FIG. 5.

FIG. 6 shows a planar integrated optical splitter 90, which can function as the 1×N optical beam splitter 80 of FIG. 5 (for N=5). The optical splitter 90 has an input hole 92. The hole 92 diffracts each received source pulse into five mutually coherent pulses, which are directed along different directions. Each mutually coherent pulse is collected by a separate optical waveguide 94–99, which carries the pulse to an optical conduit $P_1$–$P_5$. The optical waveguides $P_1$–$P_5$ can be continuations of the waveguides 94–99 or optical fibers of various lengths.

Figure 7:
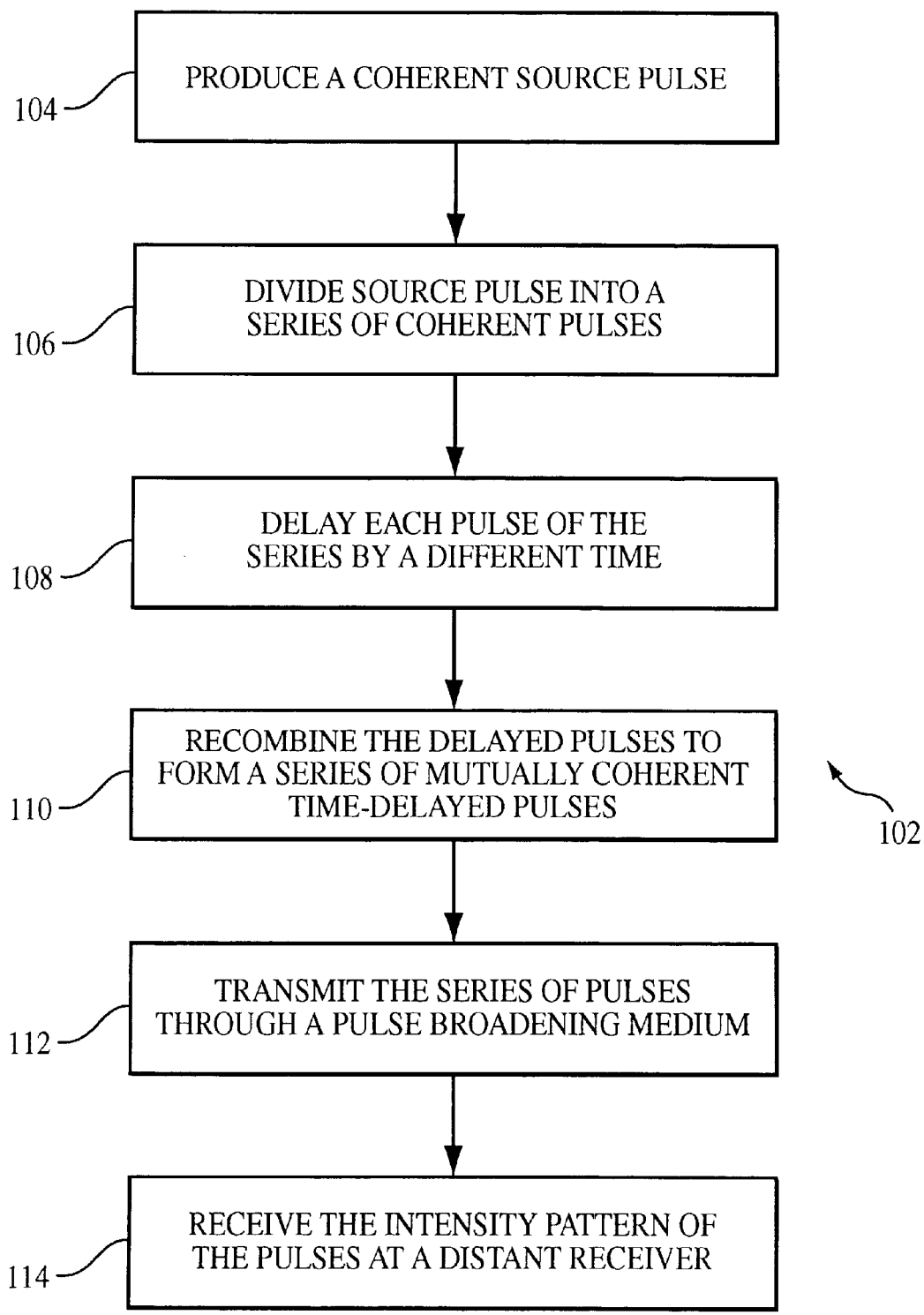
FIG. 7 is a flow chart illustrating a method of transmitting an optical pulse in the system of FIG. 2.

FIG. 7 is a flow chart showing a method 102 of transmitting an optical pulse in a transmission system, e.g., the system 50 of FIGS. 2 and 5. To produce a source pulse, the programmable shutter 77 chops a coherent source beam from the laser 74 into pulses (step 104). The 1×N optical beam splitter 80 divides the source pulse into N coherent pulses directed towards the different optical waveguides $P_1$–$P_N$ (step 106). Each of the N coherent pulses travels through one of the waveguides $P_1$–$P_N$ to produce a pulse with a different delay (step 108). Each waveguide $P_1$–$P_N$ delays pulses therein by a time proportional to the length of the waveguide's optical path. Next, the inverted 1×N beam splitter 82 recombines the delayed pulses to produce a series of mutually coherent pulses (step 110). Each successive pulse of the series has a different time delay. The inverted 1×N beam splitter 82 acts as an optical combiner, which transmits the series of coherent pulses through a transmission medium (step 112). The transmission medium may be the optical fiber 52 of FIG. 2, free space, or another medium for transmitting optical signals. The receiver 65 receives mutually coherent broadened pulses at the distant receiving point 71 (step 114). Due to interference, the received pulses form an intensity pattern 70 that is narrower than any single one of the received pulses at the receiver 65. Generally, dividing the source pulse into several mutually coherent and temporally spaced pulses at step 104 produces a narrower intensity pattern at the receiver 65 in step 114.

Figure 8:
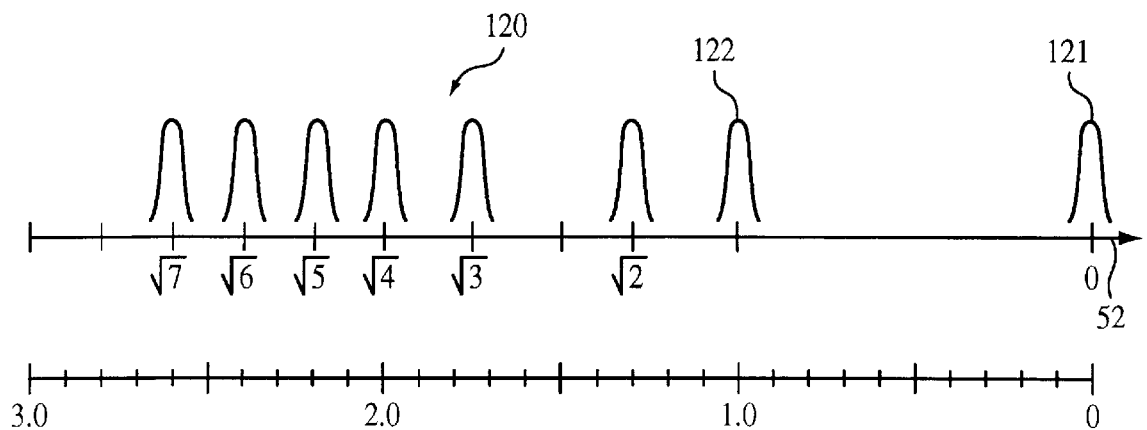
FIG. 8 shows a non-uniformly spaced series of time-delayed coherent pulses to use in the system of FIG. 2.

FIG. 8 shows one selection for a series 120 of mutually coherent pulses produced by the pulse splitter 79. The N-th pulse is delayed with respect to the first pulse 121 by $(N)^{1/2}$ times the delay of the second pulse 122. This non-uniform spacing of pulses produces, in the receiver 65, an interference pattern with an enhanced central maximum 67. The temporal spacing of the pulses produces an enhanced central maximum in a manner similar to the manner in which the non-uniform spatial spacing of the rings 51 of the zone plate 46 of FIG. 4B produces the focused spot 49.

If delay times of the pulses with respect to the first pulse of the series have the more general form $t(N^D+C)^E$, pulse compression also occurs at the receiver 65. Here, "t" is between about $10^{-3}$ and $10^{+5}$ times the source pulse's coherence time, i.e., the time over which the phase of the source pulse is correlated. The numbers C, D, and E are all between about −10 and +10.

Figure 9:
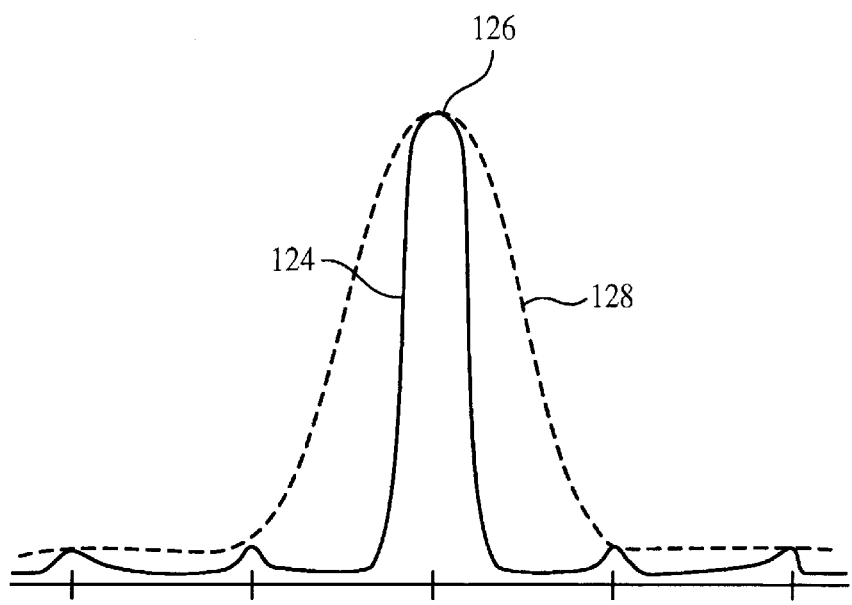
FIG. 9 shows the packet produced by the series of pulses of FIG. 8 after traveling through an optical fiber.

FIG. 9 shows the packet 124, which is received at point 71 in FIG. 2, for the non-uniform pulse spacings of FIG. 8. The packet 124 has a single central maxima 126 and very small or absent secondary maxima 127. The central maxima 126 is much narrower than the envelope 128, which the original source pulse (not shown) would have produced after traveling down the fiber 52. Thus, this non-uniform spacing of pulses in the series 120 produces a real pulse compression at the distant point 71 of FIG. 2.

FIGS. 10–12D show alternate embodiments for the pulse splitter 79 used by the transmitter 72 of FIG. 5.

Figure 10:
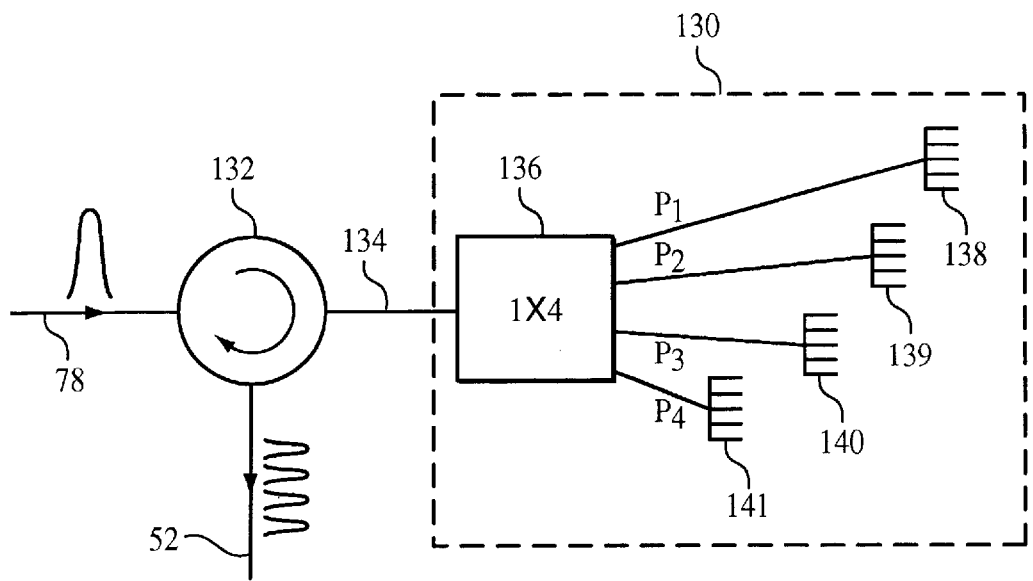
FIG. 10 shows another pulse splitter, which uses a circulator to produce the series of pulses in FIGS. 2 and 8.

FIG. 10 shows a second pulse splitter 130, which uses a single 1×4 fiber coupler 136 to produce the series of four delayed coherent pulses 56–59 shown in FIG. 2. An optical circulator 132 transmits the source pulse to an arm 134 connected to the 1×4 fiber coupler 136. The four outputs of the fiber coupler 136 couple to optical waveguides $P_1$–$P_4$. Each waveguide $P_1$–$P_4$ has a reflector 138–141 attached to its free end to reflect any pulse incident thereupon. Each pulse receives a time delay equal to twice the optical length of the waveguide $P_1$–$P_4$. The delayed series of pulse return along the arm 134 and are directed by the circulator to the optical fiber 52.

Figure 11A:
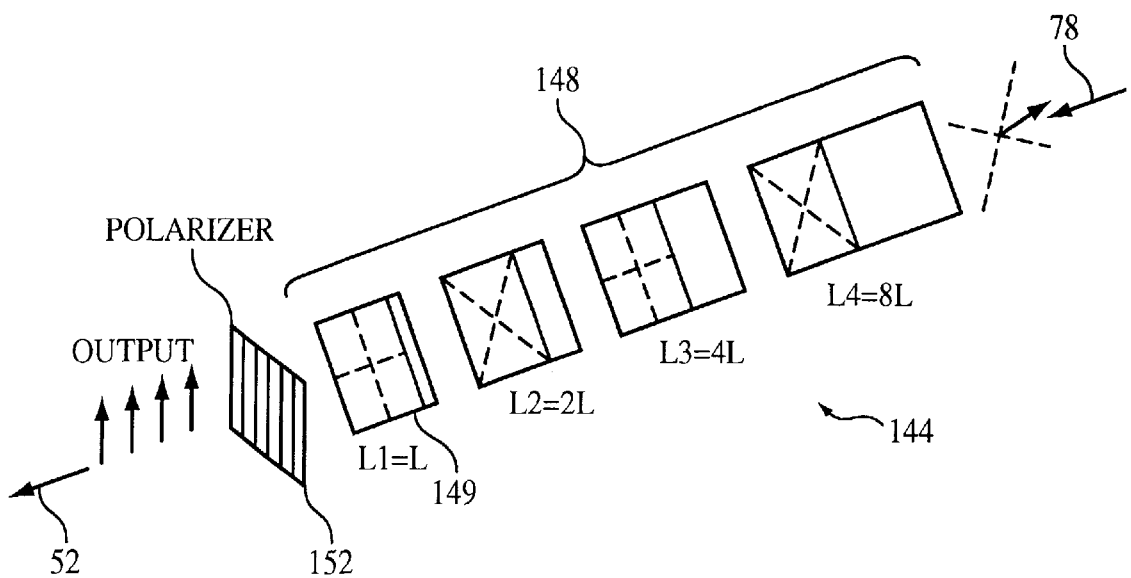
FIGS. 11A–11B show other pulse splitters, which use birefringent devices to produce the equally spaced pulses in FIG. 2.
Figure 11B:
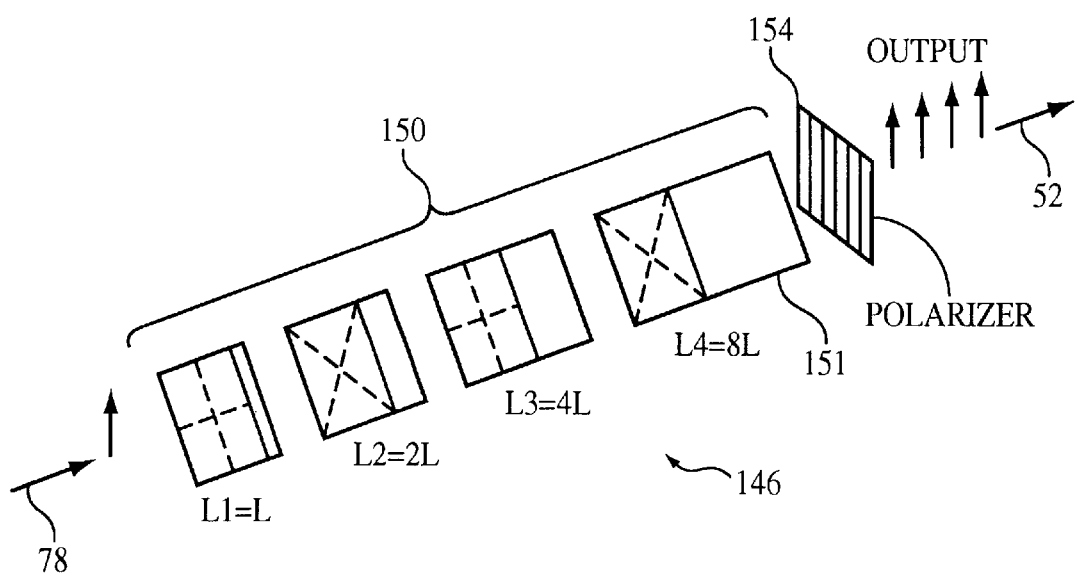
Figure 12A:
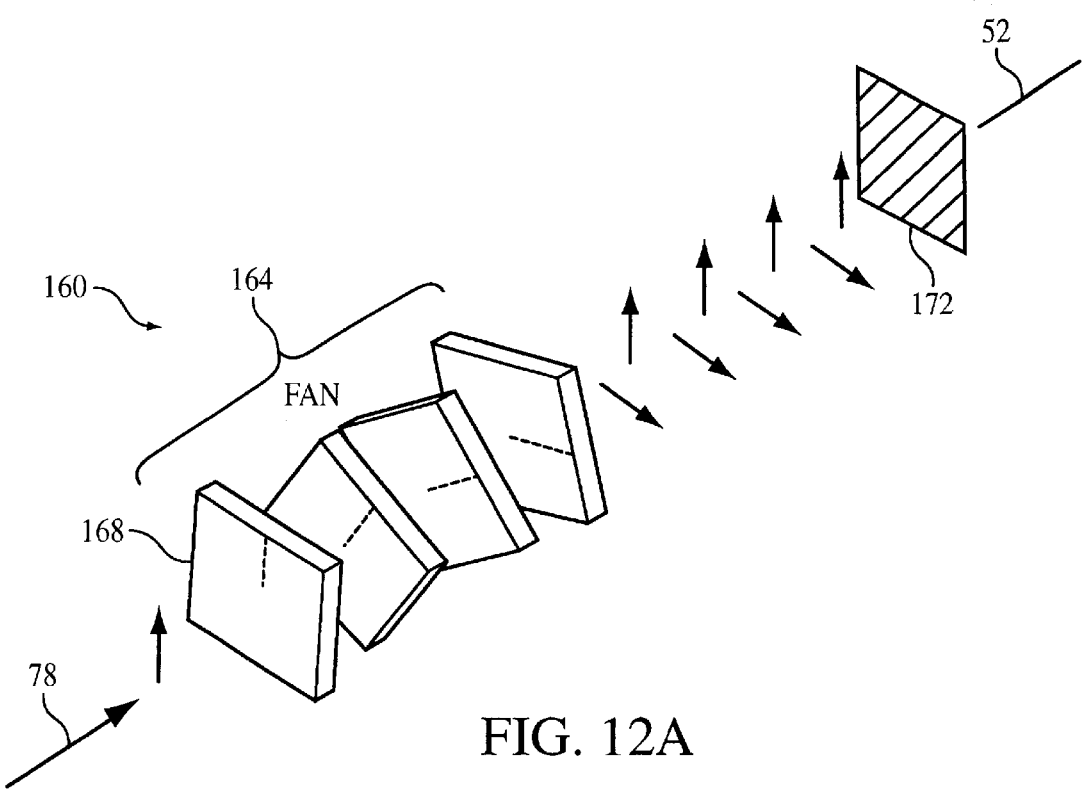
FIGS. 12A–12D show other pulse splitters, which use birefringent devices to make the pulses shown in FIG. 2.
Figure 12B:
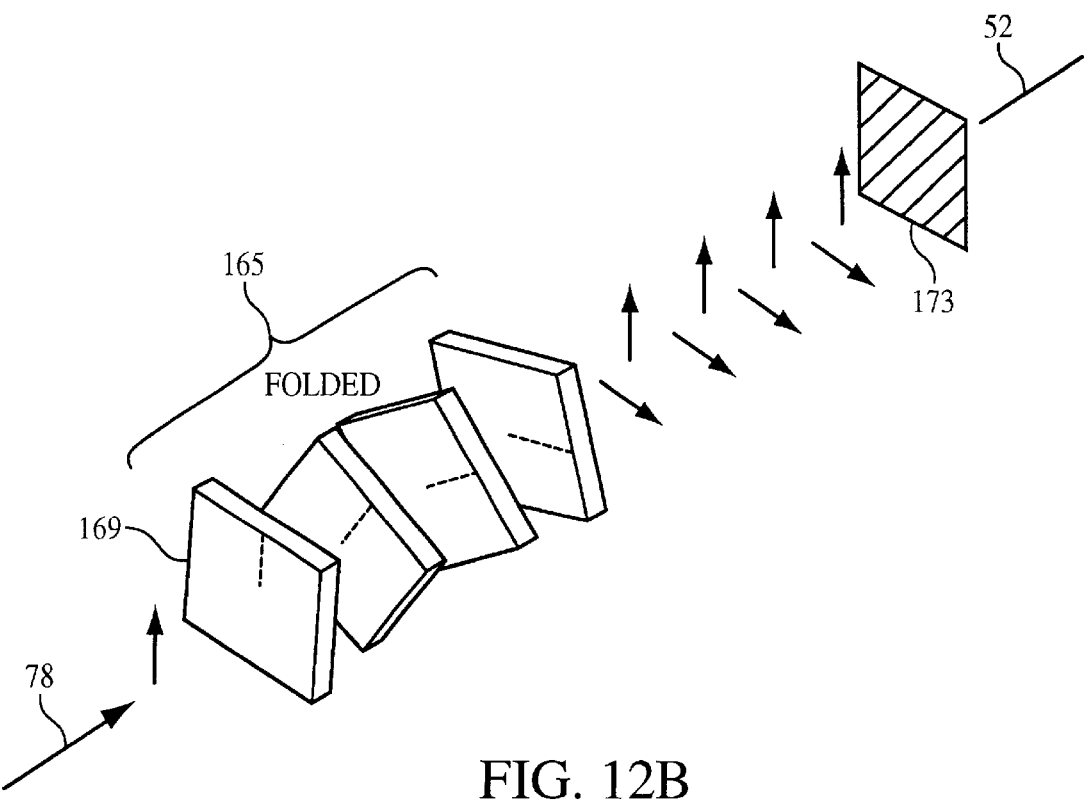
Figure 12C:
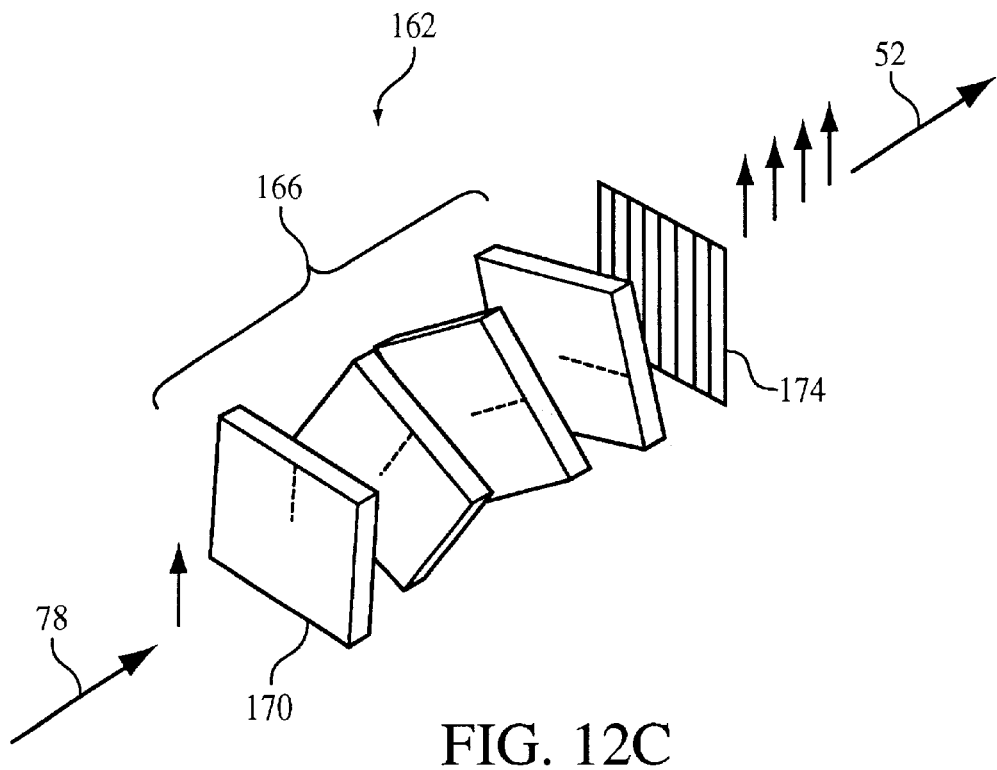
Figure 12D:
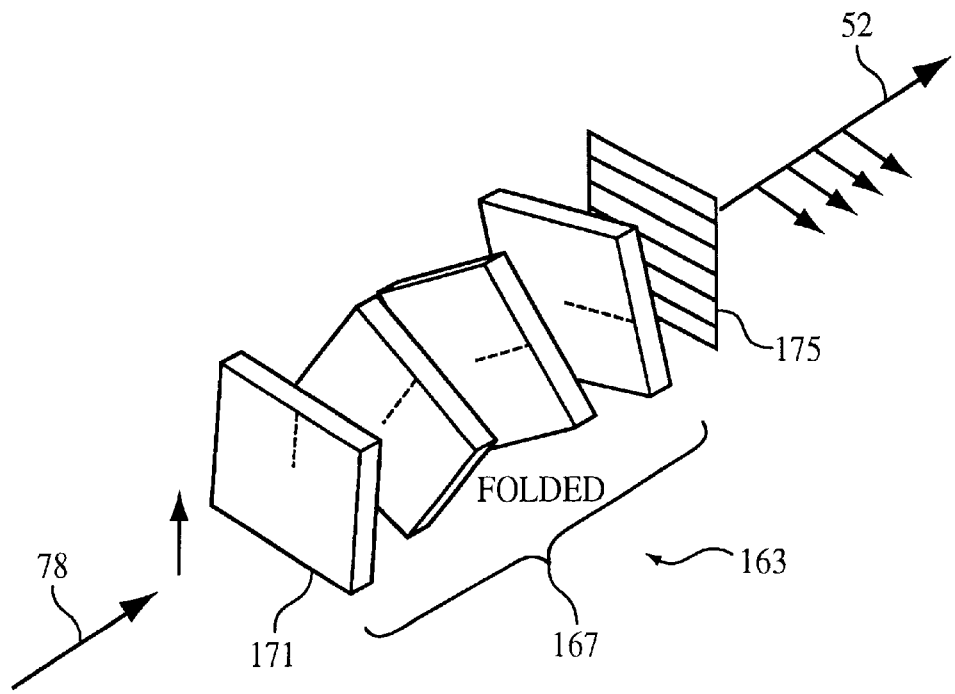

FIGS. 11A–11B illustrate pulse splitters 144, 146, which use a series 148, 150 of birefringent elements. Some of the birefringent elements of the series 148, 150 may be polarization maintaining erbium doped fibers, which are optically pumped to produce gain. In the four element series 148, 150, the consecutive elements have thicknesses forming the sequence L, 2L, 4L, 8L. For an N element series, the elements will have optical lengths L, 2L, 4L, ... $2^N L$ and will produce a series of N pulses. Adjacent elements 148, 150 have their optical directrixes rotated by about 45 degrees. Here, the optical directrix is an intrinsic axis of a birefringent medium along which the refractive index is independent of the polarization. Finally, the source pulse is polarized at either 45 degrees or 0 degrees to the directrix of the last element 149, 151 of each series 148, 150. Polarizers 152, 154 filter the output pulses from the series 148, 150 to produce the series of the equally-spaced pulses 56–59 shown in FIG. 2.

FIGS. 12A–12D illustrate alternate pulse splitters 160–163. Each pulse splitter 160–163 uses a series 164–167 of birefringent elements. Some of the birefringent elements may be polarization maintaining erbium doped fibers, which are optically pumped to produce gain. All elements, e.g., the elements 168–171, of each series 164–167 have equal thicknesses. Adjacent elements of each series 164–167 have a fixed rotation angle between their optical directrixes.

The rotation angle is equal to 90 degrees divided by the number of elements in the series. The source pulse is plane polarized. The polarization plane of the source pulse makes a tilt angle with respect to the directrix of the first slab 168–171 of the relevant series 164–167. The tilt angle equals half of the rotation angle. Polarizers 172–175 filter the mutually coherent pulses produced by each series 164–167 to produce a single polarization in the equally spaced pulses 56–59 shown in FIG. 2.

Figure 13:
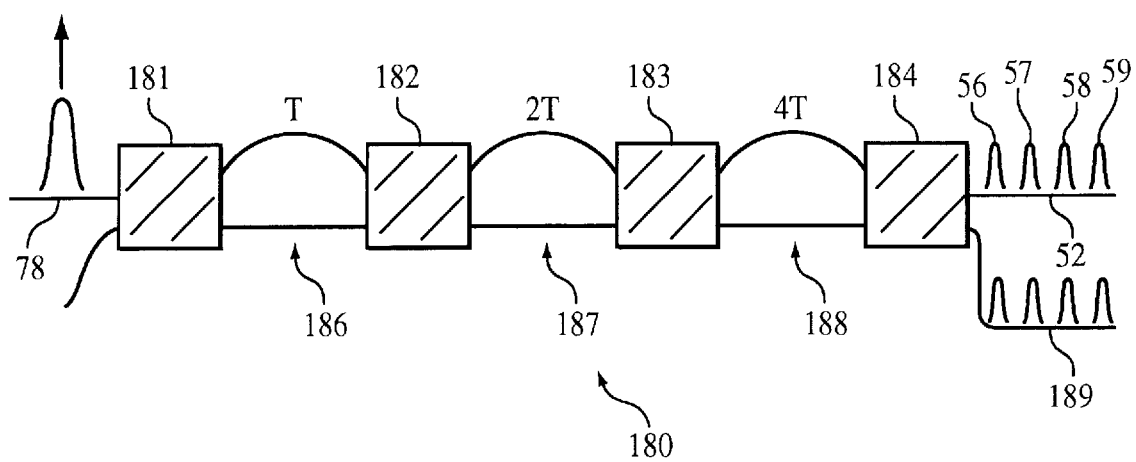
FIG. 13 illustrates another pulse splitter, which uses a series of 2×2 fiber couplers to produce the equally spaced series of pulses in FIG. 2.

FIG. 13 illustrates another pulse splitter 180, which uses a series of 2×2 fiber couplers 181–184 and pairs of optical fibers 186–188 to produce the equally spaced pulses 56–59 shown in FIG. 2. The 2×2 fiber couplers 181–184 form cascaded Mach Zehnder interferometers. Each Mach Zehnder 181–184 interferometer splits each received pulse into two pulses. The two pulses acquire a timing difference of "T" after traveling through the two associated output fibers 186–188 of unequal length. The timing differences accumulate, because the pulses travel through several stages of the interferometers.

Generally, the pulse splitter 180 may have N stages to produce N mutually coherent, time-delayed pulses. The pulse splitter 180 also has a second output 189, which produces a second series of mutually coherent, time-delayed pulses.

Figure 14A:
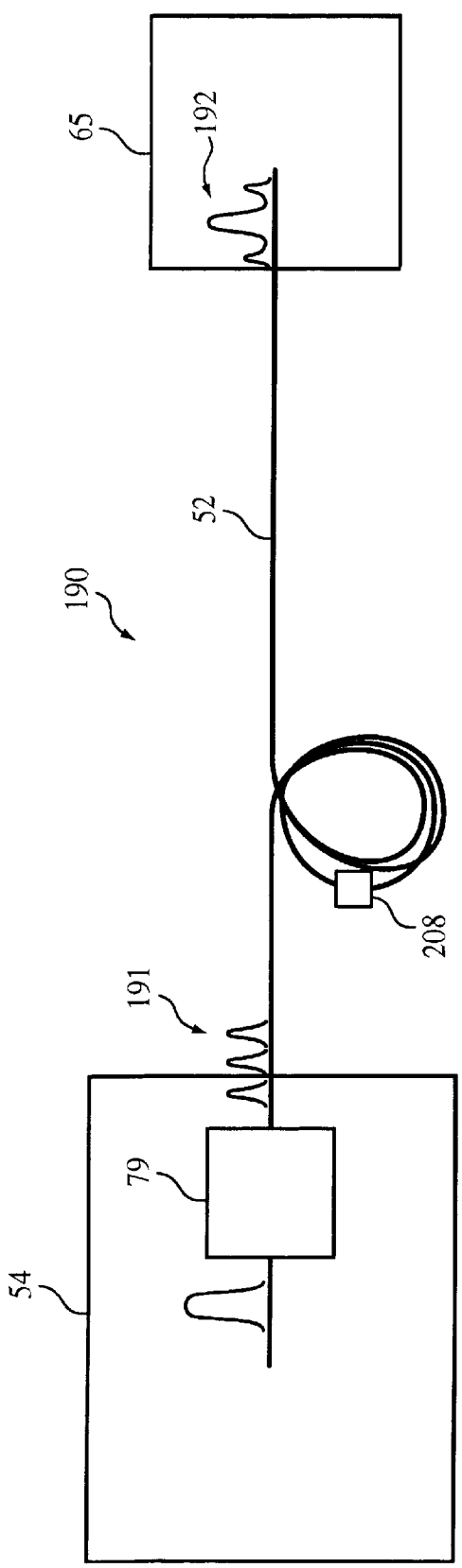
FIG. 14A shows an optical transmission system in which a pulse splitter is located in the transmitter.

FIG. 14A shows a first optical transmission system 190, which places the pulse splitter 79 in the transmitter 54. Thus, a series of coherent pulses 191 propagates down the fiber 52 in the system 190. Interference among dispersion broadened pulses produces a compressed pulse 192 at the receiver 65.

Figure 14B:
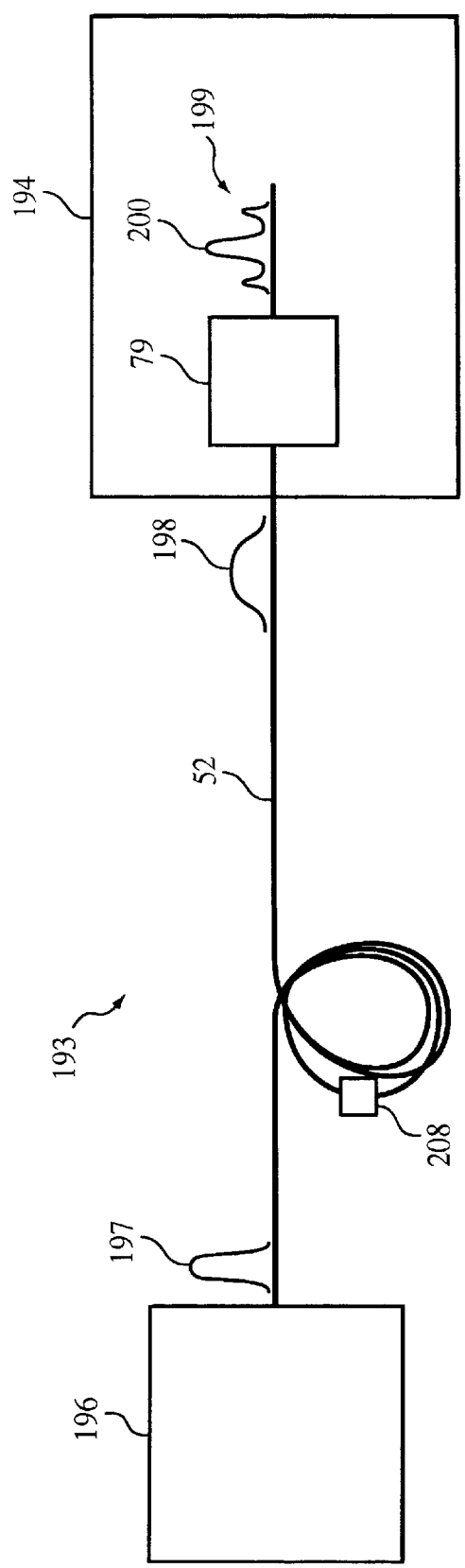
FIG. 14B shows an optical transmission system in which a pulse splitter is located in the receiver.

FIG. 14B shows a second optical transmission system 193, which places the pulse splitter 79 in the receiver 194. Here, a transmitter 196 sends a single coherent source pulse through the fiber 52. The source pulse 197 becomes a wide pulse 198 due to dispersion. At the receiver 194, the pulse splitter 79 splits the widened source pulse 198 into a series of widened pulses, which are time delayed. Since each pulse of the series is mutually coherent, an interference pattern 199 is produced in the receiver 194. The interference pattern 199 has a narrower central maximum 200 similar to the maxima 67, 126 of FIGS. 2 and 9.

Referring to FIGS. 14A–14B, the various embodiments may include optical amplifiers 208 to boost the amplitude of the pulses in the transmission fiber 52. For example, the amplifiers 208 may use optically pumped erbium fibers to augment the intensity of received optical pulses.

Figure 14C:
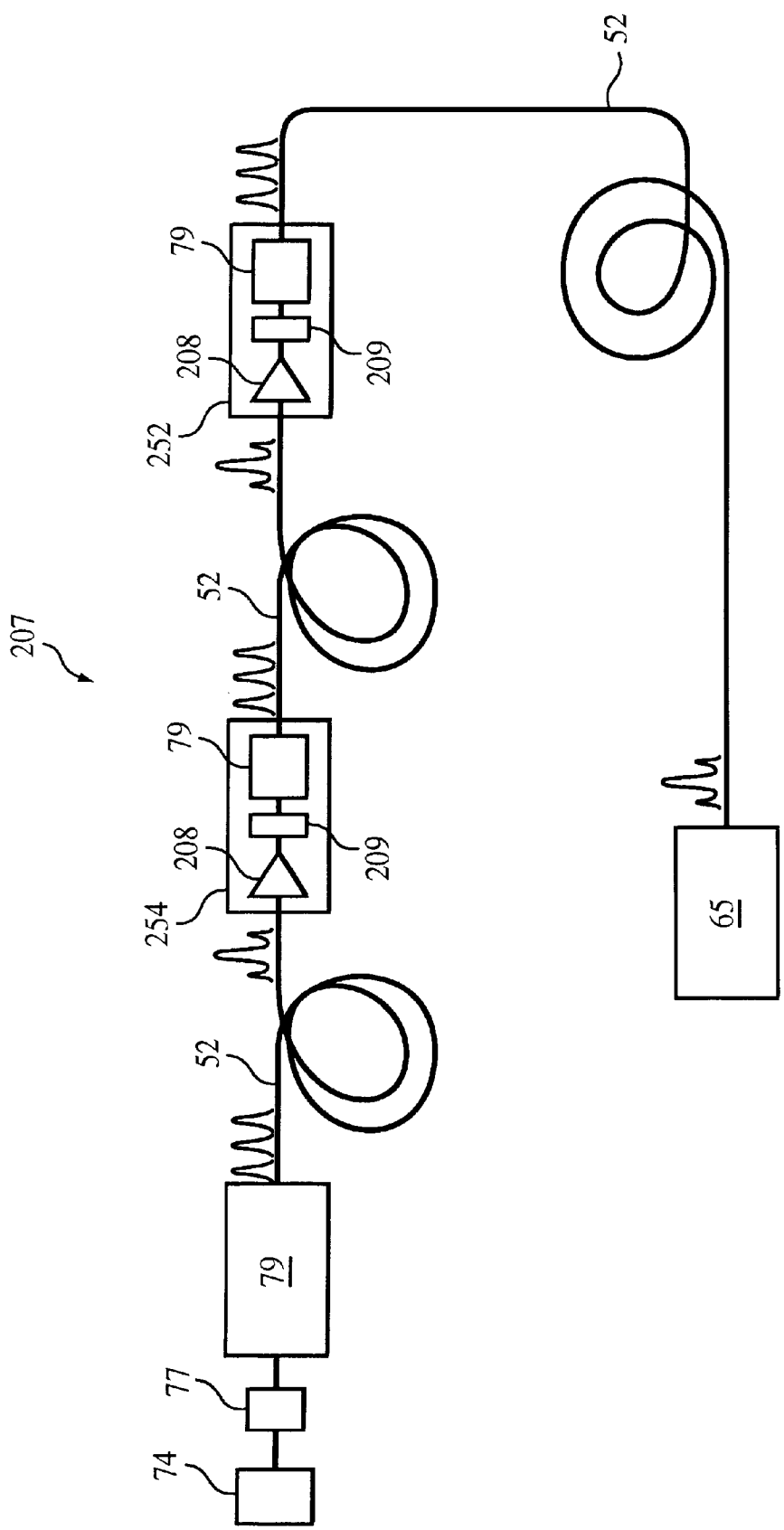
FIG. 14C shows a transmission system, which uses pulse splitters and optical amplifiers at intermediate locations along the transmission fiber 52.

FIG. 14C shows a transmission system 207, which positions optical regenerators 252 and 254 at convenient intermediate locations along the fiber 52. Each regenerator 252, 254 includes an amplifier 208, a filter 209, and a pulse splitter 79. The amplifiers 208 augment the intensities of the received optical pulses. The filters 209 are narrow bandpass optical filters or nonlinear optical loop mirrors configured to remove secondary maxima from the interference patterns of the received pulses. The pulse splitters 79 form series of mutually coherent pulses from the received pulses to counteract broadening produced in the following segment of the optical fiber 52.

Referring again to FIG. 2, the transmitter 54 of some embodiments uses a special laser configured to produce the series of mutually coherent delayed pulses 56–59. Such lasers produce a series of mutually coherent optical pulses 56–59 in response to either a single control electrical pulse or a series of such electrical pulses when operated in known configurations. The laser transmits the series directly into the optical fiber 52 without sending the pulses through other devices to enhance inter-pulse spacings. The inter-pulse spacings cause pulse compression through interference at the point 71 within the receiver as shown in FIG. 2.

Figure 15A:
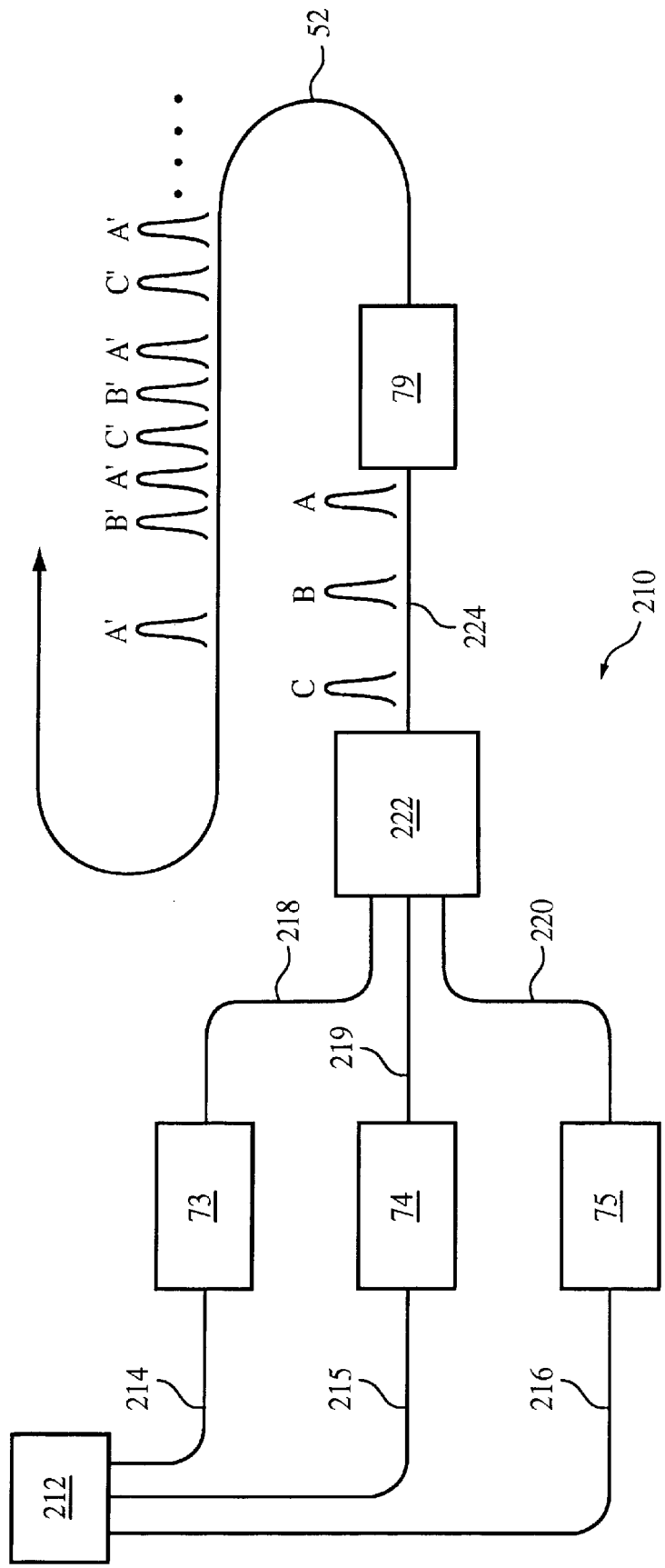
FIG. 15A shows a transmitter, which interleaves mutually incoherent pulses to reduce interference between pulses for different data bits.

FIG. 15A shows a transmitter 210 that interleaves mutually incoherent optical pulses to reduce interference between pulses for different digital data bits. A generator 212 produces electrical signals for the sequence of digital data bits to be transmitted across the optical fiber 52. Through lines 214–216, the generator 212 transmits the electrical signals to lasers 73–75. The lasers 73–75 produce optical source pulses. The electrical signals from the generator 212 control individual optical shutters (not shown) that chop the output beams of each laser 73–75 into the optical source pulses. An optical combiner 222 receives the optical source pulses through fibers 218–220 and transmits the source pulses A, B, and C to a fiber 224.

The generator 212 temporally interleaves the transmission of source pulses from the first, second, and third lasers 73–75. The interleaving ensures that the same laser 73–75 does not produce consecutive pulses A, B, C for consecutive data bits. For example, the generator 212 may send the signal for the first data bit to the first laser, the signal for the second data bit to the second laser 74, and the signal for the third data bit to the third laser 75. Since none of the lasers 73–75 receives consecutive electric signals, each consecutive optical source pulse A, B, and C come from different ones of the lasers 73–75.

The fiber 224 transmits the pulses A, B, and C to the pulse splitter 79 of FIG. 5. For each received pulse A, B, and C, the pulse splitter 79 produces a series of delayed mutually coherent pulses A', B', and C' as described in FIGS. 2 and 5. The different sequences of delayed pulses A', B', C' are interleaved in time.

As dispersion broadening occurs each pulse A', B', C' of the different series can physically overlap. For example, the series of A' pulses associated with the original A pulse may overlap with the series of B' pulses associated with the original B pulse. The transmitter 210 reduces undesired interference between the different series of pulse A', B', C' by making the original pulses A, B, C mutually incoherent. The pulses A, B, C are mutually incoherent, because each consecutive pulse A, B, C is produced by a different one of the lasers 73–75.

Figure 15B:
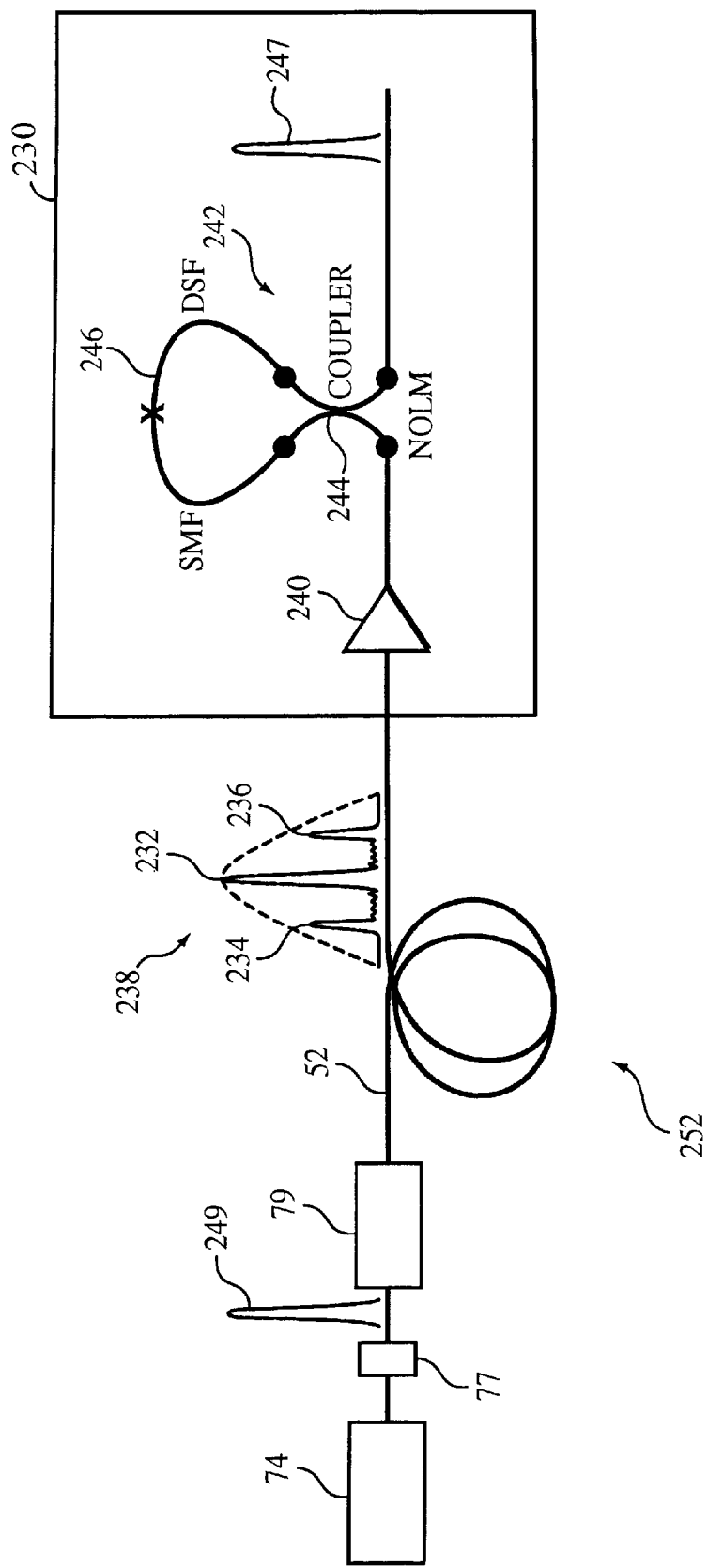
FIG. 15B shows a regenerator or receiver, which uses a NOLM as a filter.

FIG. 15B shows a regenerator or receiver 230, which enhances the central and/or removes the secondary maxima 234 and 236 from the interference pattern 238 produced by the pulses 56–59 of FIG. 2. The receiver 230 amplifies the received optical signal with an optical amplifier 240 and then sends the amplified signal to a nonlinear optical loop mirror (NOLM) 242. The NOLM includes a 4-port optical coupler 244 in which two ports are coupled by an optical fiber loop 246. The fiber loop 246 includes a standard single mode fiber (SMF), e.g., the model SMF-28 fiber produced by Corning, Inc, of Corning N.Y. The SMF connects in series to a dispersion shifting fiber (DSF).

The NOLM 242 is a light intensity discriminator, which filters out optical signals having intensities below a preset threshold. By matching the amplifier 240 to the NOLM 242, the NOLM 242 filters out the secondary maxima 234 and 236 to produce an output signal consisting of a single narrow peak 247. Instead of the NOLM 242, some other. embodiments use a different narrow bandpass optical filter to remove the secondary maxima 234 and 236.

The width of the central maxima 232 can also be modified by varying the number of mutually coherent pulses in the series, e.g., the series of pulses 56–59 of FIG. 2. Increasing the number of mutually coherent pulses in the series generally narrows the central maximum 232. If the number of mutually coherent pulses is large enough, the central maximum 232 can be as narrow as the original source pulse 249 from the shutter 77.

Some embodiments shift the position of the central maximum 232 in the interference pattern 238 through the time delays between the mutually coherent pulses 56–59. Shifting the position of the central maximum 232 in the interference pattern 238 changes its wavelength and gives the output pulse 247 a wavelength shifted with respect to that of the source pulse 249. Thus, the system 252 of FIG. 15B can act as a "frequency converter" based on dispersion.

Figure 16A:
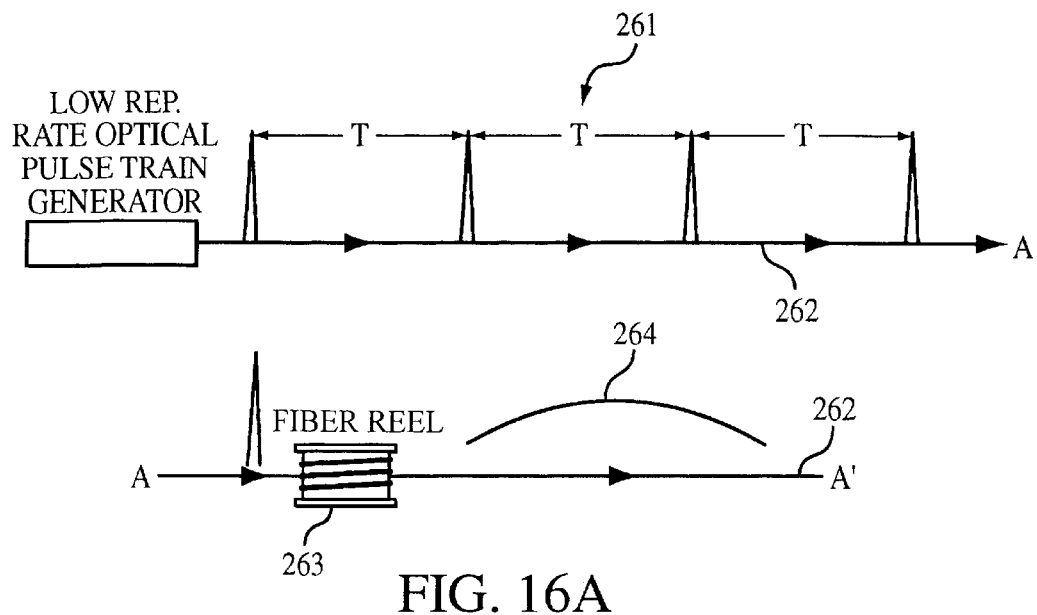
FIGS. 16A–16C illustrate a high frequency optical clock, which employs a pulse splitter.
Figure 16B:
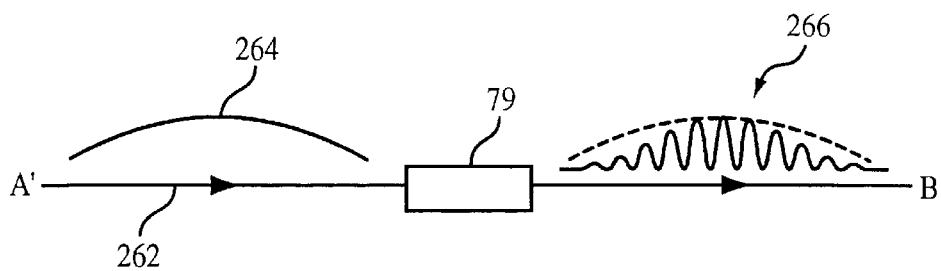
Figure 16C:
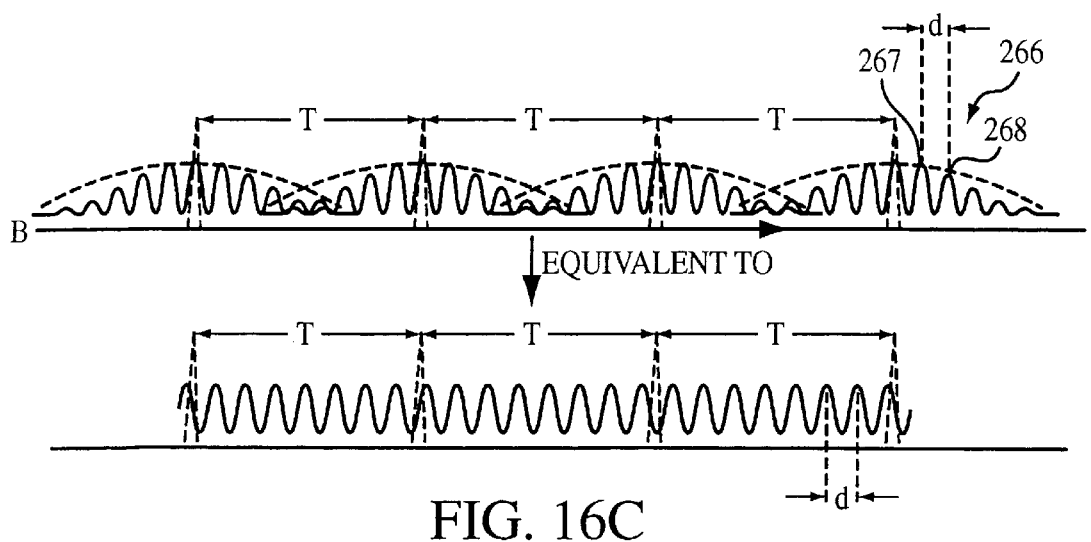

FIGS. 16A–16C show that the pulse splitter 79 can be used to generate high frequency optical timing signals from low frequency optical timing pulses. In FIG. 16A a series of low frequency pulses 261 is transmitted through into an optical fiber 262. The pulses travel through a length of dispersive fiber, e.g., a long length of fiber rolled up on a fiber wheel 263, and produce broad pulses 264. In FIG. 16B, the pulse splitter 79 is inserted into the fiber 262 to generate interference, which modulates pattern 266 on the broad pulse 264. FIG. 16C shows that the spacing "d" between the peaks of the modulated pattern 266 provides an optical timing signal having a higher frequency than the initial pulse rate $T^{-1}$.

The spacing "d" between the output pulses 267–268 is proportional to the dispersion and inversely proportional to the delay introduced between mutually coherent pulses by the pulse splitter 79. The frequency of the final timing pulses 267–268 of FIG. 16C can be adjusted to an integral multiple original frequency of the pulses of FIG. 16A. By adjusting the length of fiber on the roll 263 and/or the delays produced by the pulse splitter 79, one can generate final frequencies, which are integral multiples of the original frequency.

Finally, the techniques and devices of FIGS. 2 and 5 can reduce optical pulse broadening when pulses are transmitted in other media, e.g., free space. In free space transmission, the optical fiber 52 is replaced by an atmospheric transmission link. The atmosphere also generates chromatic dispersion and scattering in pulses, which also lead to pulse broadening. Splitting the original pulses into a temporal series of mutually coherent pulses, as shown in FIG. 2, can reduce pulse broadening in atmospheric transmission systems.

For atmospheric transmission systems, the pulse splitter 79 transmits the series of mutually coherent pulses 56–59 to the "atmospheric transmission link". The series of pulses broaden and interfere during atmospheric transmission. But, the receiver 65 receives the narrower pattern 64 from the atmosphere due to interference.

Other embodiments are within the scope of the following claims.

What is claimed is:

1. A method for transmitting a signal pulse in a dispersive transmission media, said method comprising:
    for the signal pulse, producing a series of temporally spaced, substantially non-overlapping, mutually coherent optical pulses; and
    transmitting the series of optical pulses through the dispersive transmission media, the optical pulses of the series of optical pulses having a temporal spacing selected such that after traveling a distance along the transmission medium, the temporally spaced, substantially non-overlapping optical pulses broaden and overlap and as a consequence interfere to form an interference pattern having an interference peak that is narrower than the broadened optical pulses.

2. The method of claim 1, wherein the transmitting sends the series of optical pulses through an optical fiber.

3. The method of claim 1, wherein the signal pulse is in the form of coherent optical pulse and wherein the producing of the series of coherent optical pulses comprises separating the coherent optical pulse into a plurality of mutually coherent optical pulses and wherein the producing of the series of coherent optical pulses involves producing said series of temporally spaced, substantially non-overlapping, coherent optical pulses from said plurality of mutually coherent pulses.

4. The method of claim 3, wherein the producing further comprises:

sending each of said plurality of optical pulses through a separate waveguide to produce a delayed pulse, each delayed pulse having a different delay; and recombining the delayed pulses to produce the series temporally spaced, substantially non-overlapping, coherent optical pulses.

5. The method of claim 4, wherein the time delays are adapted to remove secondary interference maxima between the series of pulses at the distant region.

6. The method of claim 4, wherein the successive pulses of the series are approximately equally spaced.

7. The method of claim 5, wherein each successive pulse of the series has a delay of approximately $t_R(N^D+C)^E$ with respect to a preceding pulse, the number N being a serial order of the preceding pulse, and wherein $t_R$ is a positive real number, and D, C and E are real numbers.

8. The method of claim 7, wherein $t_R$ is between about $10^{-3}$ and $10^5$ times a coherence time of the source pulse, and C, D, and E are between about −10 and +10.

9. The method of claim 1, wherein the transmitting sends the series of pulses through free space.

10. An apparatus for transmitting an optical signal in an optical fiber, said apparatus comprising:

a beam splitter to split a coherent optical pulse into a plurality of coherent optical pulses;

a plurality of optical waveguides, each waveguide located to receive a corresponding different one of the plurality of coherent light pulses and to produce a temporally delayed optical pulse, each waveguide being an optical path with a different optical length; and a combiner located to receive the temporally delayed optical pulse from each of said plurality of waveguides and to redirect the received optical pulses into the optical fiber as a sequence of optical pulses, wherein the plurality of optical waveguides are selected so that the sequence of optical pulses is a sequence of substantially non-overlapping, temporally spaced, coherent optical pulses that interfere to form an interference pattern having an interference peak that is narrower than the broadened optical pulses.

11. The apparatus of claim 10, wherein the waveguides are optical fibers having different lengths.

12. The apparatus of claim 10 further comprising:

a source of polarized coherent pulses; and wherein the beam splitter and the plurality of optical waveguides comprise a series of birefringent elements located to receive each polarized pulse from the source, the series of birefringent elements to produce a series of equally spaced pulses from each polarized pulse; and a polarizer located to project the series of pulses in a selected direction.

13. An apparatus for transmitting an optical pulse, said apparatus comprising:

an optical fiber;

a source of coherent optical pulses;

a pulse splitter to split each of the coherent optical pulse into a sequence of mutually coherent optical pulses, said pulse splitter including a plurality of optical delay elements, each delay element producing a different delay in a corresponding one of the mutually coherent optical pulses, the delays of the plurality of optical delay elements selected so that said sequence of mutually coherent optical pulses is a sequence of substantially non-overlapping, temporally spaced, coherent optical pulses; and an optical circulator located to send the pulses from the source to the pulse splitter and to send the sequence of mutually coherent pulses from the pulse splitter to the fiber that interfere to form an interference pattern having an interference peak that is narrower than the broadened optical pulses.

14. The apparatus of claim 13, wherein the plurality of optical delay elements is a plurality of optical waveguides and wherein the pulse splitter further comprises:

a 1×N beam splitter having an input located to receive light from the circulator and having N outputs, wherein each of said outputs is connected to a first end of a corresponding different one of the optical waveguides; and a plurality of reflectors, each reflector attached to a second end of a corresponding different one of the optical waveguides.

15. A transmission system for optical signals, said system comprising:

a transmitter to produce source optical pulses;

an optical pulse splitter to produce from each of the source optical pulses a series of mutually coherent optical pulses, said pulse splitter including a plurality of optical delay elements, each delay element producing a different delay in a corresponding one of the mutually coherent optical pulses, the delays of the plurality of optical delay elements selected so that said series of mutually coherent optical pulses is a series of substantially non-overlapping, temporally spaced, mutually coherent optical pulses that interfere to form an interference pattern having an interference peak that is narrower than the broadened optical pulses;

an optical fiber connecting the transmitter to the optical splitter;

a receiver for optical signals; and an optical transmission channel connecting the splitter to the receiver.

16. The system of claim 15, wherein the splitter is adapted to produce pulse compression at the receiver.

17. The system of claim 15, wherein the plurality of optical delay elements is plurality of optical waveguides, each of which is characterized by a different optical path length, and wherein the pulse splitter comprises:

a beam splitter to split each source pulse into a plurality of optical pulses, wherein each of said plurality of optical waveguides is located to receive a corresponding different one of the plurality of optical pulses; and an optical combiner located to receive output from each of said optical waveguides and to redirect the output received from the optical waveguides into an optical fiber.

18. The system of claim 17, wherein the optical waveguides are optical fibers having different lengths.

19. The system of claim 15, wherein the pulse splitter comprises:

a series of birefringent elements located to receive the source pulses, the series birefringent elements to produce a sequence of equally spaced optical pulses from each source pulse; and a polarizer located to project the sequence of optical pulses into a selected direction as the series of mutually coherent optical pulses.

20. The system of claim 15, wherein the pulse splitter comprises:

a pulse splitter element to split each of the source pulses into a sequence of mutually coherent optical pulses; and an optical circulator located to the send optical pulses from the source to the pulse splitter element and to send the mutually coherent optical pulses from the pulse splitter element to the optical transmission channel.

21. The system of claim 20, wherein the plurality of optical delay elements is plurality of optical waveguides, each of which is characterized by a different optical path length, and wherein the pulse splitter element comprises:

a 1×N beam splitter having an input located to receive light from the circulator, wherein each of said plurality of optical waveguides has a first end coupled to a corresponding different one of the outputs of the 1×N beam splitter; and a plurality of reflectors, each of which is coupled to a second end of a corresponding different one of the optical waveguides.

22. The system of claim 15, further comprising a regenerator having an input coupled to the pulse splitter by the optical transmission channel; and a second optical transmission channel coupling an output of the regenerator and to the receiver, the regenerator including an optical amplifier and a second pulse splitter to regenerate received pulses.

23. The system of claim 22, wherein the regenerator includes one of an optical bandpass filter and an intensity discriminator to remove secondary maxima from interference patterns.

24. The system of claim 15, wherein the receiver includes one of an optical bandpass filter and an intensity discriminator to remove secondary maxima from interference patterns.

25. A method for producing optical timing pulses, said method comprising:

transmitting a sequence of original optical timing pulses through a dispersive transmission medium to produce a second sequence of optical pulses that are broadened as a result of passing through the dispersive medium, wherein the original optical timing pulses of the first sequence are characterized by a first pulse width and the broadened pulses of the second sequence are characterized by a second pulse width that is larger than the first pulse width; and for each optical pulse of the second sequence, (a) generating a plurality of temporally delayed, mutually coherent optical pulses, each member of the plurality of optical pulses having a different delay, and (b) combining the plurality of temporally delayed optical pulses so that they interfere with each other to form an interference pattern characterized by equally spaced apart intensity peaks, the intensity peaks of said interference pattern being a timing signal having higher frequency than the frequency of the original optical timing pulses.

26. The method of claim 25, wherein the higher frequency is an integer multiple of the temporal frequency of the sequence of original timing pulses.

27. A method for producing optical timing pulses, the method comprising:

receiving a sequence of original optical timing pulses;

for each optical timing pulse of the sequence, generating a series of temporally spaced, substantially non-overlapping, mutually coherent optical pulses; and transmitting the series of optical pulses through a dispersive optical transmission medium, the optical pulses of the series of optical pulses having a temporal spacing selected such that after traveling a distance along the transmission medium, the temporally spaced, substantially non-overlapping optical pulses broaden and overlap and as a consequence interfere to form an interference pattern characterized by equally spaced apart intensity peaks, the intensity peaks of said interference pattern being a timing signal having higher frequency than the frequency of the original optical timing pulses.

28. The method of claim 27, wherein the generating comprises:

for each optical timing pulse of the sequence, (a) producing a plurality of mutually coherent optical pulses;

(b) sending each of said plurality of optical pulses through a separate waveguide to produce a delayed optical pulse, each delayed pulse having a different delay; and (c) recombining the delayed pulses to produce the series of optical pulses.

* * * * *